UNITED STATES PATENT OFFICE 2,461,679

METHOD OF REACTING A PIPERYLENE WITH A HALO SUBSTITUTED MALEIC ANHYDRIDE

Albert M. Clifford, Stow, and Clyde E. Gleim, Akron, Ohio, assignors to Wingfoot Corporation, Akron, Ohio, a corporation of Delaware No Drawing. Application September 4, 1944, Serial No. 552,680

1 Claim. (Cl. 260—78.5)

This invention relates to polymeric addition products and to a method for their preparation. More particularly, it relates to addition polymers of certain alkyl substituted butadienes and the chlorine-substituted maleic anhydrides.

It is well known that unsaturated hydrocarbons, especially the homologues of butadiene, will condense in the presence of an unsaturated acid anhydride, such as maleic acid, to form addition compounds. Such compounds are known as Diels-Alder reaction products and are formed by the interaction of equimolecular portions of the anhydride and the olefin hydrocarbon. Compounds of this type are not polymeric in nature and are generally not capable of being polymerized.

The present application is related to very different compounds which are resinous and have a relatively high and usually indeterminable molecular weight. The new compounds are elastic and are capable of being fabricated into many useful articles where a rubber-like film-forming composition is required.

In accordance with this invention piperylene in either the "cis" or "trans" structure may be reacted with a chlorine-substituted maleic anhydride. The reaction is conducted at subnormal temperatures by merely mixing mono or dichloromaleic anhydride, and one of the substituted butadienes and a suitable solvent. After several hours the solution becomes cloudy, and after several days a substantial quantity of the elastic polymer will have precipitated. The polymer may then be separated by filtration or decantation, and washed with suitable non-solvents. Generally, small proportions of the normal Diels-Alder reaction product will also be formed, which compound may be removed from the solvent by distillation.

The normal Diels-Alder condensation takes place in accordance with the following reaction:

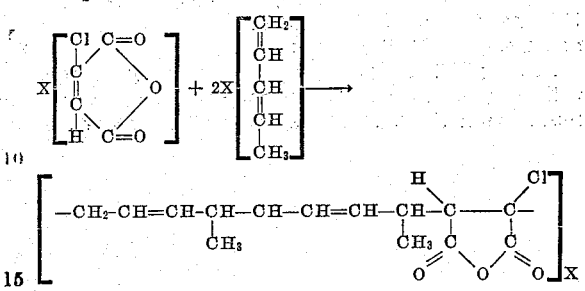

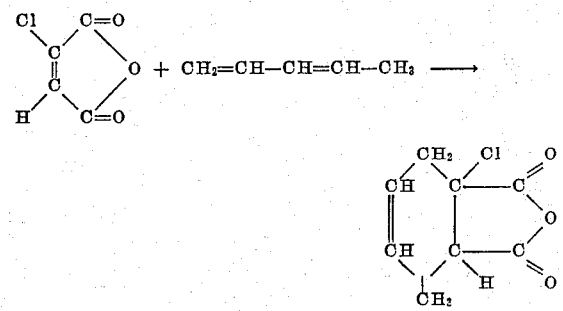

The following equation is believed to represent the reaction by which the polymeric addition compound is formed:

$$\left[\begin{array}{c}Cl\ C=O\\ \diagdown / \\ C \\ \parallel\ \diagdown O\\ C \\ \diagup \diagdown \\ H\ \ \ C=O\end{array}\right]_X + 2X\left[\begin{array}{c}CH_2\\ \parallel\\ CH\\ \mid\\ CH\\ \parallel\\ CH\\ \mid\\ CH_3\end{array}\right] \longrightarrow$$

$$\left[-CH_2-CH=CH-\underset{\underset{CH_3}{\mid}}{CH}-CH-CH=CH-\underset{\underset{CH_3}{\mid}}{CH}-\underset{}{\overset{H}{C}}\diagdown\underset{O\diagup\ \ ^O\diagdown O}{\overset{Cl}{C}}\right]_X$$

Of these reactions the first results in the formation of the common or "normal" Diels-Alder product while the second reaction produces the polymeric addition product. Attempts have been made to prepare the new polymers from any diolefine hydrocarbons but only piperylene reacted in this manner.

Suitable solvents for use in the reactions are the organic liquids in which the alkyl-substituted butadienes are soluble but in which the polymer is insoluble. Aromatic hydrocarbons, such as benzene and toluene are examples of this type of solvent. Other solvents, such as dioxan or acetone, may be used except that non-solvents, such as benzene and water, must be added to coagulate the polymer. Lower temperatures, for example 0° C., appear to favor the polymer formation.

Further details of the preparation of the new compounds will be apparent from an examination of the following examples.

Example 1

Monochloromaleic anhydride (80 grams) and 55 grams of cis-piperylene were dissolved in 250 cc. of anhydrous benzene and maintained at a temperature between 5-10° C. for eleven days. A rubber-like polymer which precipitated was separated by decantation. The polymer was purified by washing with benzene and a 70% yield (based on the chloromaleic anhydride) was recovered.

By fractional distillation of the filtrate, approximately a 30% yield of a normal Diels-Alder reaction product was recovered, B. P. 156–159° C/23 mm., $n_D^{27.5}=1.4987$, $D_{15}^{27.5}=1.2995$.

Example 2

The procedure of Example 1 was duplicated except that "trans" piperylene was used in place of the "cis" piperylene. A very substantial yield of a clear, transparent, elastic polymer was recovered.

The new compounds when freshly prepared are elastic and non-tacky, but after standing in air for several days they gradually become harder. The new materials and their esters are soluble in acetone and alcohol, and may be cast to form thin transparent films. Accordingly, the new materials have great utility as coating compositions and in the manufacture of wrapping films. Solutions of the materials are useful as adhesives. Molding compositions may be prepared by esterifying the polymers with hot alcohol vapor and subsequently compounding with pigments, plasticizers, sulphur and other conventional compounding ingredients. The molded products are insoluble in water, petroleum ether and dilute sulphuric acid, and are only slightly softened by contact with benzene and ether.

This application is a continuation-in-part of application, Serial No. 477,105, filed February 25, 1943 by Albert M. Clifford and Clyde E. Gleim now issued as U. S. 2,391,226.

Although the invention has been described with respect to specific examples, it is not intended that the details thereof shall be construed as limitations upon the scope of the invention, except as incorporated in the following claim.

We claim:

The rubbery polymeric material prepared by reacting 55 parts of piperylene with 80 parts of a compound of the group consisting of monochloromaleic anhydride and dichloromaleic anhydride dissolved in an aromatic hydrocarbon solvent at a temperature between 0° and up to 10° C. until the reaction is complete and recovering the polymeric material.

ALBERT M. CLIFFORD.
CLYDE E. GLEIM.

REFERENCES CITED

The following references are of record in the file of this patent:

UNITED STATES PATENTS

| Number | Name | Date |
|---|---|---|
| 1,944,731 | Diels et al. | Jan. 23, 1934 |
| 2,263,002 | Hopff et al. | Nov. 11, 1941 |
| 2,391,226 | Clifford et al. | Dec. 18, 1945 |

FOREIGN PATENTS

| Number | Country | Date |
|---|---|---|
| 526,168 | Germany | June 17, 1931 |
| 842,186 | France | Feb. 27, 1939 |

Certificate of Correction

Patent No. 2,461,679.  February 15, 1949.

ALBERT M. CLIFFORD ET AL.

It is hereby certified that errors appear in the printed specification of the above numbered patent requiring correction as follows:

Column 1, lines 53 to 55 inclusive, for that portion of the formula reading

column 2, line 20, for the word "any" read *many*;

and that the said Letters Patent should be read with these corrections therein that the same may conform to the record of the case in the Patent Office.

Signed and sealed this 13th day of September, A. D. 1949.

[SEAL]

JOE E. DANIELS,
*Assistant Commissioner of Patents.*